United States Patent
Slama et al.

(10) Patent No.: US 10,385,891 B2
(45) Date of Patent: Aug. 20, 2019

(54) MAGNETIC SENSOR ARRANGEMENT FOR DETERMINING A POSITION OF AN ACTUATOR

(71) Applicant: Infineon Technologies AG, Neubiberg (DE)

(72) Inventors: Peter Slama, Klagenfurt (AT); Leo Aichriedler, Puch (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/706,463

(22) Filed: Sep. 15, 2017

(65) Prior Publication Data

US 2019/0085875 A1    Mar. 21, 2019

(51) Int. Cl.
| | | |
|---|---|---|
| *F16K 37/00* | (2006.01) | |
| *F15B 15/28* | (2006.01) | |
| *G01D 5/12* | (2006.01) | |

(52) U.S. Cl.
CPC ...... *F15B 15/2861* (2013.01); *F16K 37/0025* (2013.01); *F16K 37/0033* (2013.01); *F16K 37/0041* (2013.01); *F16K 37/0083* (2013.01); *G01D 5/12* (2013.01); *Y10T 137/8158* (2015.04); *Y10T 137/8225* (2015.04); *Y10T 137/8242* (2015.04)

(58) Field of Classification Search
CPC ............. F16K 37/0083; F16K 37/0025; F16K 37/0033; F16K 37/0041; F15B 15/2861; G01D 5/12; Y10T 137/8158; Y10T 137/8225; Y10T 137/8242

See application file for complete search history.

(56) References Cited

U.S. PATENT DOCUMENTS

| | | | | |
|---|---|---|---|---|
| 7,886,767 | B2* | 2/2011 | Tschida | F15B 13/0402 137/554 |
| 2004/0211928 | A1* | 10/2004 | Coura | F16K 31/003 251/129.04 |
| 2008/0092960 | A1 | 4/2008 | Manecke et al. | |
| 2013/0075640 | A1* | 3/2013 | Grossmann | G01M 15/042 251/248 |

FOREIGN PATENT DOCUMENTS

| | | |
|---|---|---|
| DE | 10 2006 042 580 | 9/2006 |
| EP | 1980777 | 3/2011 |

* cited by examiner

*Primary Examiner* — Matthew W Jellett
(74) *Attorney, Agent, or Firm* — Harrity & Harrity, LLP

(57) ABSTRACT

A magnetic sensor arrangement for determining a position of an actuator may include a magnetic sensor to determine the position of the actuator, where the actuator may be configured to reciprocate along a longitudinal axis of an actuator housing of the actuator, such that at least a portion of the actuator may cross an end plane of the actuator housing when reciprocating along the longitudinal axis, and the magnetic sensor may sense a set of components of a magnetic field generated by a magnet, and determine, based on the sensed set of components of the magnetic field, a position of the actuator along the longitudinal axis of the actuator housing of the actuator, where the magnet may be connected to or forms part of the actuator, and where the magnetic sensor may be connected to the actuator housing, and where a portion of the magnetic sensor may be positioned at least in a first actuator position beyond the end plane of the actuator housing.

20 Claims, 10 Drawing Sheets

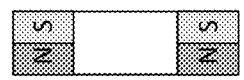
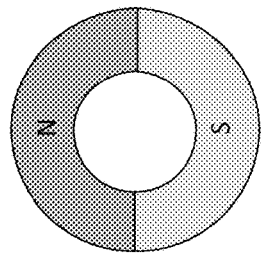
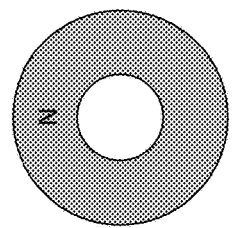
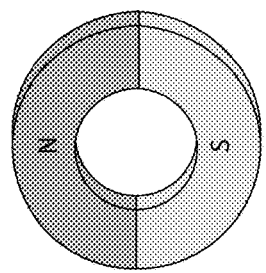
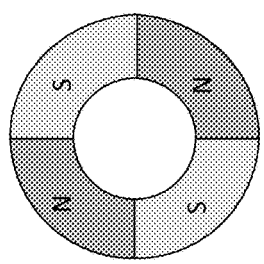
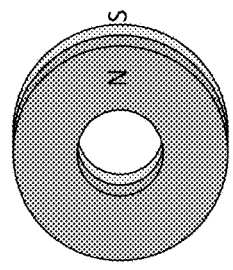
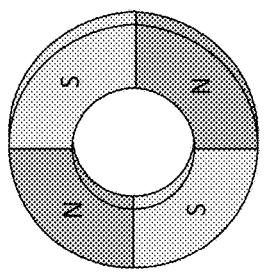
FIG. 2B
FIG. 2C
FIG. 2D

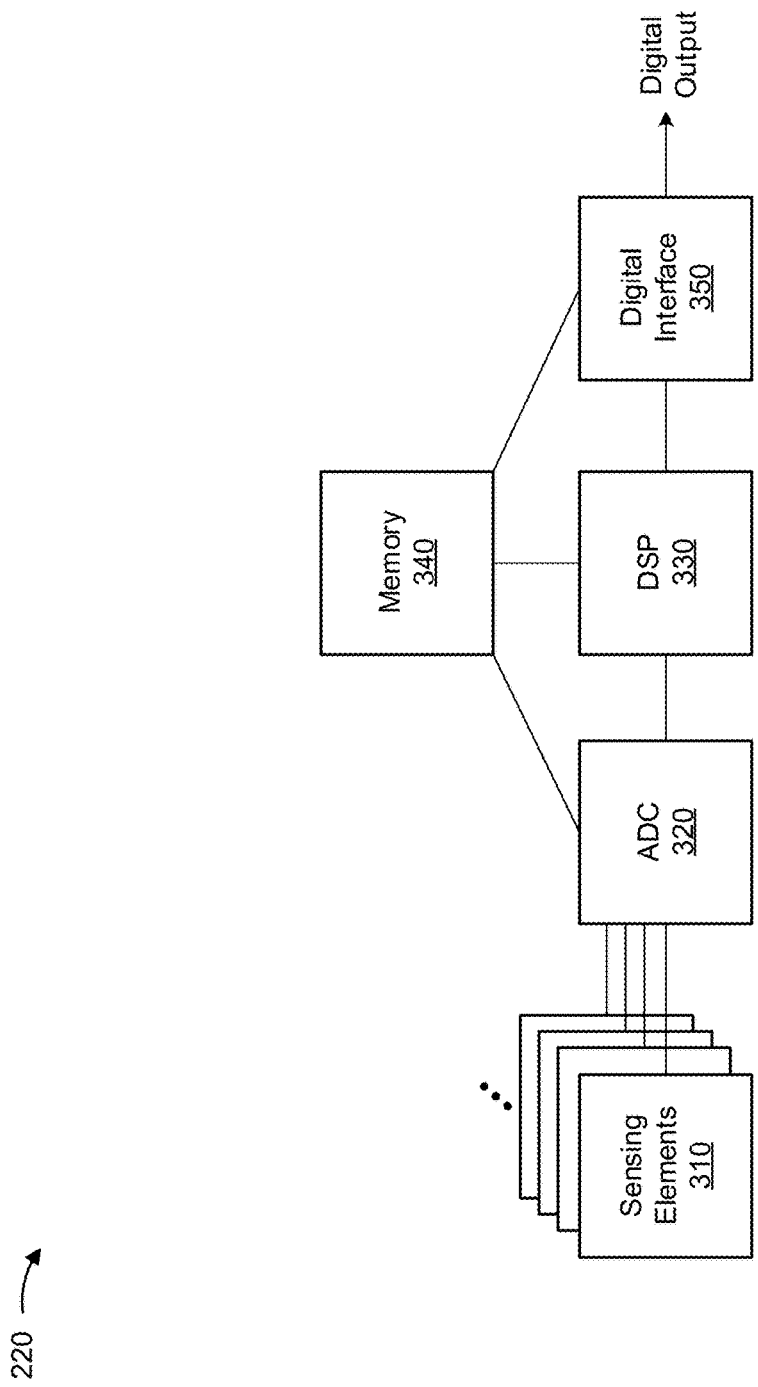

US 10,385,891 B2

MAGNETIC SENSOR ARRANGEMENT FOR DETERMINING A POSITION OF AN ACTUATOR

BACKGROUND

A magnetic sensor may be capable of sensing components of a magnetic field applied to the magnetic sensor, such as a magnetic field magnitude, magnetic field intensity, a magnetic field direction (e.g., based on directional components of the magnetic field), and/or the like. The magnetic field of the magnet may depend on a magnetization of the magnet, a shape of the magnet, an environment of the magnet, and/or one or more other factors. The magnetic sensor may be used to detect, for example, movement, position, an angle of rotation, and/or the like, of a magnet, which may be connected to an object, in a variety of applications, such as a mechanical application, an industrial application, a consumer application, and/or the like.

SUMMARY

According to some implementations, a magnetic sensor arrangement for determining a position of an actuator may include a magnetic sensor to determine the position of the actuator, where the actuator may be configured to reciprocate along a longitudinal axis of an actuator housing of the actuator, such that at least a portion of the actuator may cross an end plane of the actuator housing when reciprocating along the longitudinal axis, and the magnetic sensor may sense a set of components of a magnetic field generated by a magnet, and determine, based on the sensed set of components of the magnetic field, a position of the actuator along the longitudinal axis of the actuator housing of the actuator, where the magnet may be connected to or forms part of the actuator, and where the magnetic sensor may be connected to the actuator housing, and where a portion of the magnetic sensor may be positioned at least in a first actuator position beyond the end plane of the actuator housing.

According to some implementations, a hydraulic actuator system may include an actuator that may be capable of reciprocating along a longitudinal axis of an actuator housing of the actuator; a magnet that may be connected to or formed as part of the actuator such that the magnet moves along the longitudinal axis extending from an end plane of the actuator housing; and/or a magnetic sensor to determine a position of the actuator on the longitudinal axis of the actuator housing based on a magnetic field applied to the magnetic sensor by the magnet, the magnetic sensor being connected to the actuator housing such that a portion of the magnetic sensor extends beyond the end plane of the actuator housing, where the magnetic sensor to is to determine the position of the actuator based on sensing a set of components of the magnetic field of the magnet.

According to some implementations, a method may include providing a magnet on an actuator of a hydraulic actuator system; and/or positioning a magnetic sensor on an actuator housing of the actuator such that a portion of the magnetic sensor extends beyond an end plane of the actuator housing, where the magnetic sensor may determine a position of the actuator based on the magnetic sensor sensing a set of components of a magnetic field of the magnet, and/or provide information associated with the position of the actuator.

BRIEF DESCRIPTION OF THE DRAWINGS

FIG. 2A-2D are diagrams of an example environment in which magnetic arrangements, systems, and/or methods, described herein, may be implemented;

FIG. 3 is a diagram of example elements of a magnetic sensor that may be included in the example environment of FIG. 2;

DETAILED DESCRIPTION

Figure 1A:
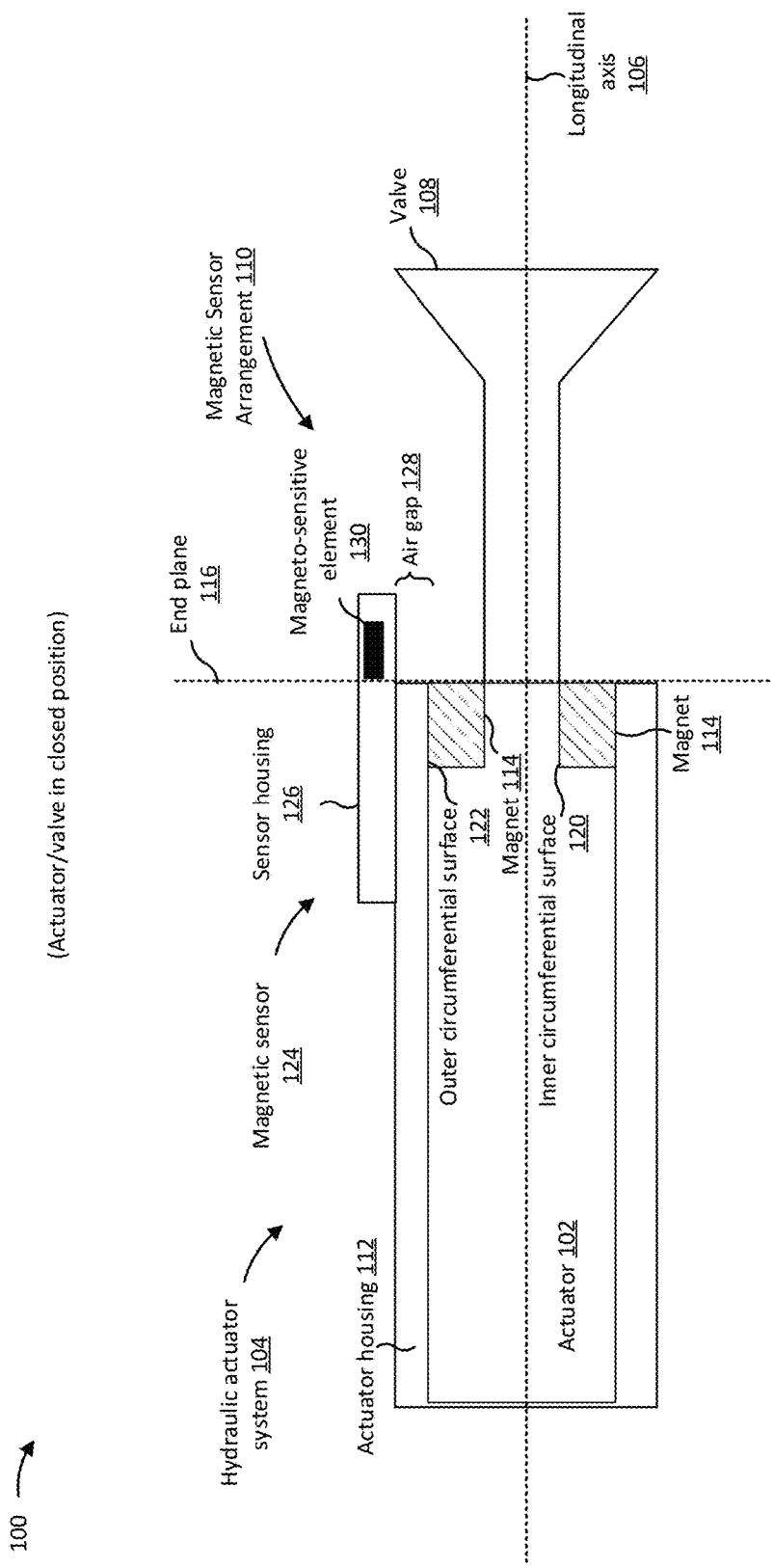
FIGS. 1A-1C are diagrams of an overview of an example implementation described herein.

The following detailed description of example implementations refers to the accompanying drawings. The same reference numbers in different drawings may identify the same or similar elements.

In internal combustion engines (ICEs), individual and/or variable control (e.g., variable valve lift, variable valve opening/closing timing, etc.) of valves (e.g., control valves that may be adjusted to be closed, partially open, fully open, and/or the like) may increase fuel efficiency and reduce fuel consumption and emissions. In traditional ICEs, valve control may be performed using a mechanical system, such as a camshaft. However, such mechanical systems may not allow for variable valve control, as they are limited to a fixed configuration or fixed mechanics of the mechanical system. Accordingly, hydraulic actuator systems may be implemented to variably control valves of an ICE. However, because there is no single mechanical system (e.g., a camshaft) that can be monitored to determine valve positions of the valves of the ICE, using hydraulic actuator systems for variable valve control may present challenges in determining the valve position of the valves of the ICE for closed loop control. In an open loop system, valve positions of the valves of an ICE may be estimated indirectly. However, due to manufacturing tolerances of the valve, mechanical parts, and/or tolerances of hydraulics, an indirect valve position determination (estimation) may not be accurate enough for closed loop control based on an actual position of the valve, which allows a controller, such as an electronic control unit (ECU), to control a valve based on a current state of the valve (e.g., a position of the valve, a speed at which the valve is moving, an acceleration at which the valve is acceleration, and/or the like).

Some implementations described herein permit accurate determination of a position (within a tolerance) of an actuator (and corresponding valve) using a magnetic sensor arrangement. In examples herein, a magnet may be connected to, formed as part of, or form part of an actuator (and/or as part of a valve or valve disk), and a magnetic sensor may be connected to an actuator housing of the hydraulic actuator system such that the magnetic sensor may measure a set of components of a magnetic field of the magnet as the magnet moves along an axis of movement (e.g., a longitudinal axis) of the actuator. In some implementations, a portion of the magnetic sensor (e.g., a portion that includes a set of magneto-sensitive elements) may be positioned beyond an end plane of the actuator housing, such that accurate measurements of the set of components of the magnetic field may be made, thereby providing increased accuracy in determining the position of the actuator relative to prior techniques (e.g., as compared to . . . ). Accordingly, some implementations described herein, provide for accurate determination of a position of an actuator (and/or valve) to enable a closed control loop of valves of an ICE.

Figure 1B:
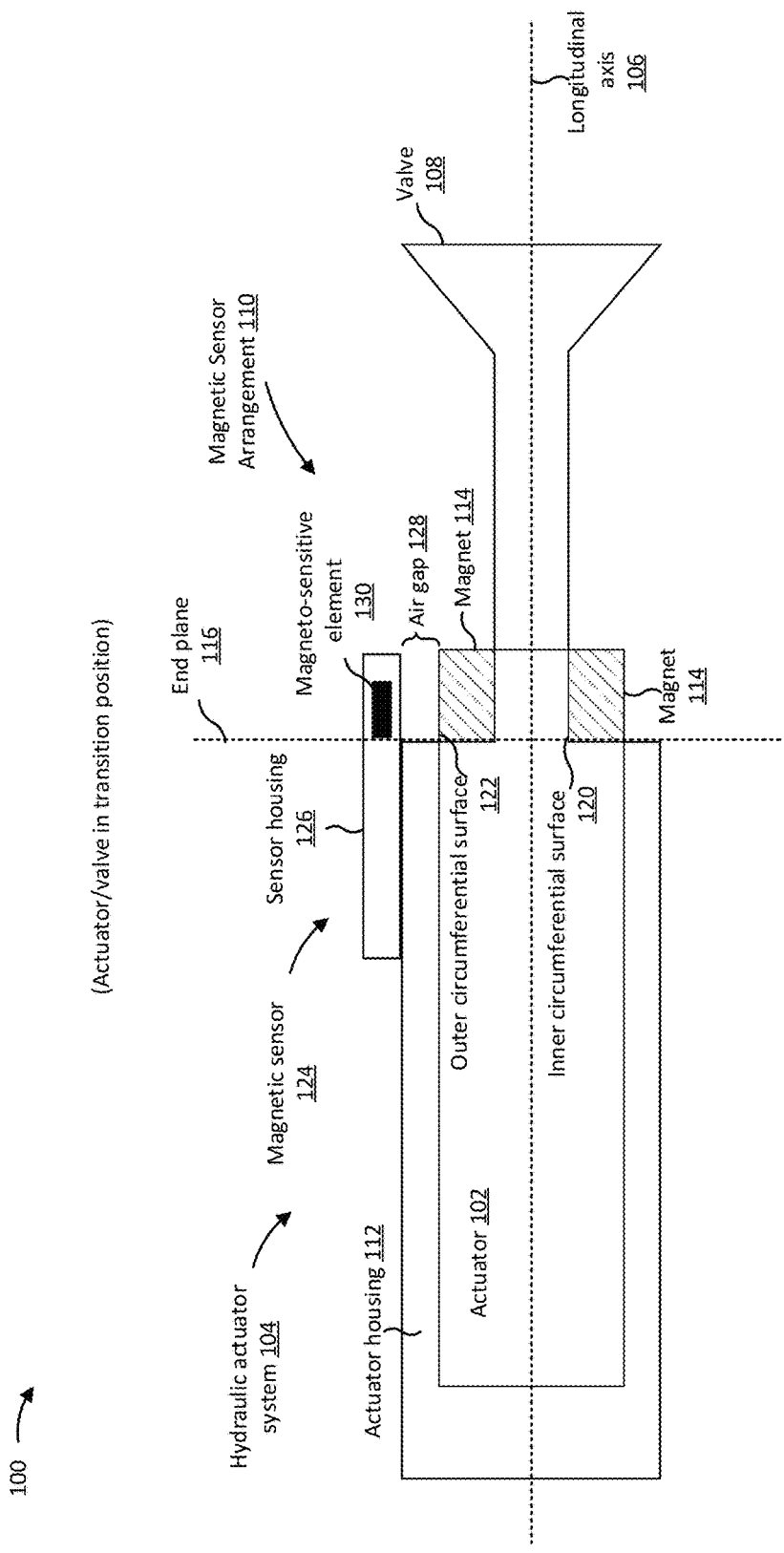
Figure 1C:
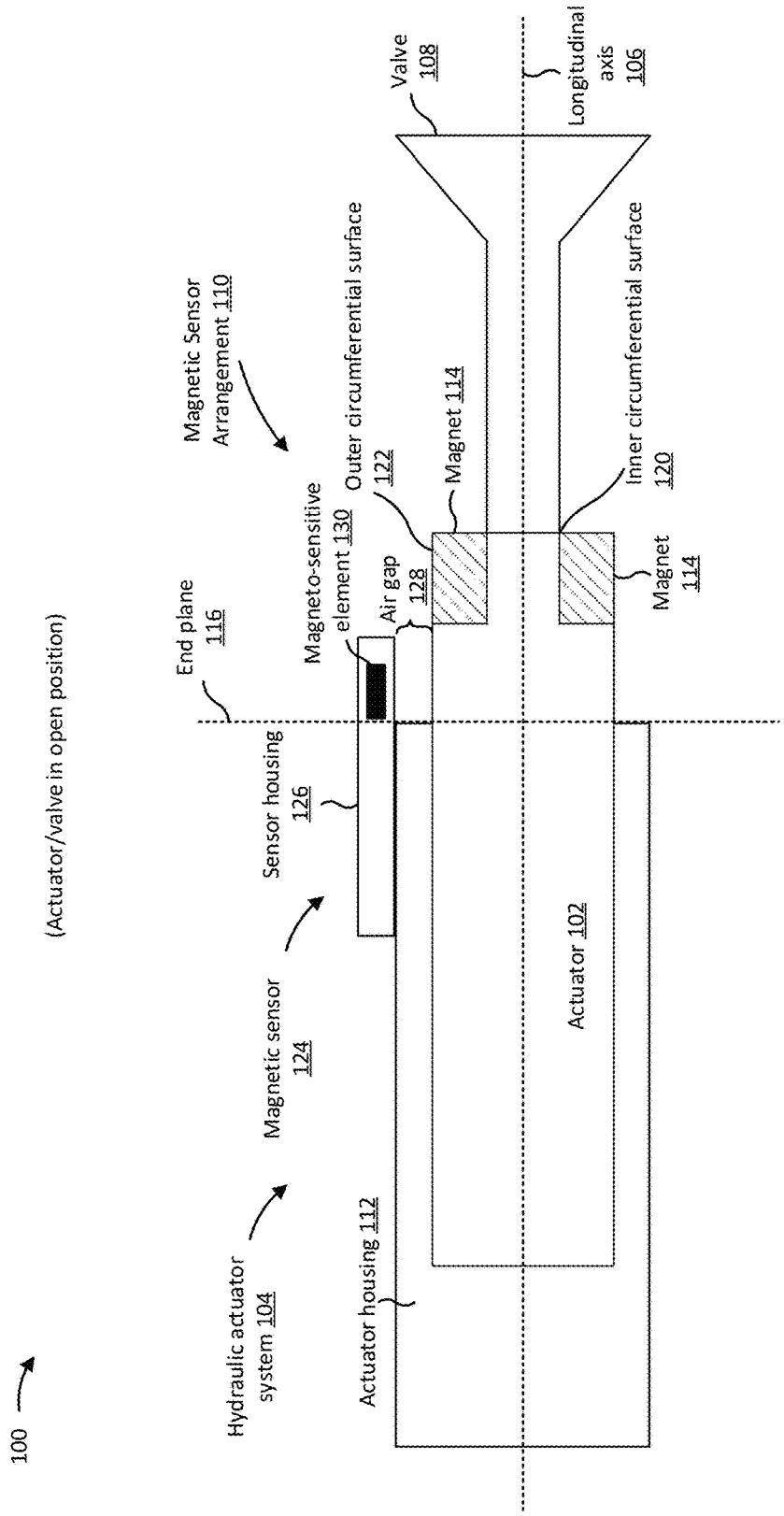

FIGS. 1A-1C are diagrams of an overview of an example implementation 100 described herein. As shown in FIGS. 1A-1C, an actuator 102 of a hydraulic actuator system 104 may move between a closed position (FIG. 1A), a transition position (FIG. 1B), and an open position (FIG. 1C). As described above, the position of actuator 102 on a longitudinal axis 106 may be of interest in a given application, such as when actuator 102 is part of hydraulic actuator system 104 that opens or closes one or more valves 108 in, for example, an ICE.

As shown in FIGS. 1A-1C, a magnetic sensor arrangement 110 is provided within hydraulic actuator system 104 that is configured to open and close valve 108 (e.g., of an ICE) to detect a position of valve 108 based on detecting a position of a magnet 114 connected to or formed as a part of actuator 102. Hydraulic actuator system 104 of example implementation 100 includes actuator 102 and an actuator housing 112. Furthermore, as shown in FIGS. 1A-1C, hydraulic actuator system 104 (and/or actuator 102 or actuator housing 112) has longitudinal axis 106 and an end plane 116 (e.g., an end plane of actuator housing 112). In some implementations, actuator housing 112 and/or actuator 102 may be a cylinder, such that the hydraulic actuator system 104 is a cylindrical system. As described herein, longitudinal axis 106 may be an axis of movement of actuator 102, such that actuator 102 reciprocates along longitudinal axis 106. In some implementations, actuator 102 may include or is connected to a mechanical transfer element (e.g., a cap) that is positioned between actuator 102 and valve 108. Accordingly, as actuator 102 moves along longitudinal axis 106, valve 108 may open or close, allowing or disallowing fluid to flow to an ICE cylinder of valve 108.

In FIGS. 1A-1C, a cross-sectional view of example implementation illustrates that magnet 114 is connected to or forms part of actuator 102. Accordingly, in example implementation, magnet 114 may be a ring magnet. For example, magnet 114, being a ring magnet, may have an inner circumferential surface 120 and an outer circumferential surface 122. As shown in FIGS. 1A-1C, magnet 114 may be connected to or form a part of actuator 102 such that actuator 102 is in contact with inner circumferential surface 120 of magnet 114. In some implementations, magnet 114 may be connected to or form a part of actuator 102 using an adhesive, over molding, injection molding, a manufacturing process, fit and/or the like. In some implementations, magnet 114 may be a shape other than a ring magnet, such as a cylindrical magnet, a conical magnet, a polyhedral magnet, or any combination thereof, and/or the like.

As shown in FIGS. 1A-1C, a magnetic sensor 124 is connected to actuator housing 112. Magnetic sensor 124 may be connected to actuator housing 112 by adhering a sensor housing 126 of magnetic sensor 124 to actuator housing 112 with an adhesive (e.g., glue, epoxy, and/or the like), over molding sensor housing 126 of magnetic sensor 124 to actuator housing 112, fastening sensor housing 126 of magnetic sensor 124 to actuator housing 112 using a fastener (e.g., a screw, a bolt, a rivet, a nail, and/or the like), clipping sensor housing 126 of magnetic sensor 124 to actuator housing 112 (e.g., using aligning mechanical notches or mechanisms in the sensor housing of the magnetic sensor and in the actuator housing), clamping (e.g., using a band clamp, a C-clamp, and/or the like) sensor housing 126 of magnetic sensor 124 to actuator housing 112, and/or the like.

According to some implementations, magnetic sensor 124 of example implementation of FIGS. 1A-1C is connected to actuator housing 112 such that a portion of magnetic sensor 124 is positioned beyond end plane 116 of actuator housing 112. For example, the portion of magnetic sensor 124 may be extended over the axis of movement (e.g., longitudinal axis 106) of actuator 102 from actuator housing 112 such that there is an air gap 128 between magnetic sensor 124 and magnet 114 and/or actuator 102 as magnet 114 and/or actuator 102 move along longitudinal axis 106. In some implementations, magnetic sensor 124 may be configured to include one or more magneto-sensitive elements 130 (which may be referred to herein individually as "magneto-sensitive element 130" or collectively as "magneto-sensitive elements 130") situated within, at, near, or toward an end of sensor housing 126 of magnetic sensor 124 (e.g., the end of sensor housing 126 that extends beyond end plane 116 of actuator housing 112). Accordingly, in some implementations, the portion or end of magnetic sensor 124 that is positioned beyond end plane 116 (i.e., over air gap 128) may include magneto-sensitive element 130. As such, magneto-sensitive element 130 may sense a set of components (i.e. one or more components) of a magnetic field of magnet 114 that is connected to or forms part of actuator 102. A set of components may be only one component, such as a magnitude of a x-component or a magnitude of a y-component or a magnitude of a z-component, an angle of a magnetic vector or a magnitude of the magnetic vector. A set of components may however also include more than one components, e.g. one or more of the above described components.

Magnetic sensor arrangement 110 of FIGS. 1A-1C may allow for increased accuracy of detecting the position of actuator 102 (and thus a position or state of valve 108) along longitudinal axis 106 relative to prior techniques. Furthermore, a proximity of magnetic sensor 124 to end plane 116 and configuration of magnet 114 on actuator 102 may allow magnetic sensor 124 and/or magneto-sensitive elements 130 to determine a current position of valve 108. From the current position, a time at which valve 108 opens or closes (e.g., based on at least a portion of magnet 114 crossing end plane 116) can be derived, for example, in an ECU.

According to some implementations herein, when magnet 114 is inside actuator housing 112 (in FIG. 1A), magnetic sensor 124 may not sense a signal as ferromagnetic properties of actuator housing 112 may shield a magnetic field of magnet 114. As magnet 114 moves to a transition position (FIG. 1B) and/or open position (FIG. 1C), magnet 114 is outside (beyond end plane 116) of actuator housing 112, and magnetic sensor 124 may sense a high magnetic field gradient from magnet 114. In this case, due to the proximity of magnetic sensor 124 to end plane 116 and/or magnet 114, enables magnetic sensor 124 high magnetic field gradient, when allows for magnetic sensor 124 to determine a position of actuator 102 within approximately 0.1 mm.

In FIG. 1A, example implementation includes a hydraulic actuator system with the actuator in a closed position. Actuator 102 may be in a closed position such that valve 108 may be in a closed position. For example, valve 108 may be closed in that valve 108 may block fluid or not allow fluid to flow into a chamber of valve 108. More specifically, actuator 102, being in a closed position, as shown FIG. 1A, may cause valve 108 to block fluid or not allow fluid to flow into a chamber or cylinder of an ICE.

In an example implementation, as shown in FIG. 1A, magnet 114, with actuator 102 in the closed position, is within actuator housing 112. According to some implementations, magnetic sensor 124, arranged as shown in FIG. 1A, may sense that actuator 102 is in the closed position based on measuring a set of components of a magnetic field of magnet 114 that indicate the position of magnet 114 (and correspondingly, actuator 102 and valve 108) along longitudinal axis 106 that corresponds to a closed position. For example, in FIG. 1A, magnetic sensor 124 may measure an intensity of a magnetic field of magnet 114 that indicates that magnet 114 is within actuator housing 112 (as compared to when magnet 114 is outside of actuator housing 112, indicating that the actuator is in a transition position or open position), thereby indicating that that valve 108 may be in a closed position.

In FIG. 1B, example implementation 100 includes hydraulic actuator system 104 with actuator 102 in a transition position. Actuator 102 may be in a transition position such that valve 108 may be transitioning from a closed position to an open position. Accordingly, valve 108 may be considered to be partially opened, as opposed to being in a fully opened positioned, as shown in FIG. 1C). For example, in FIG. 1B, valve 108 may be in a position to begin to allow fluid to flow into a chamber of valve 108. More specifically, actuator 102, being in the transition position as shown FIG. 1B, may cause valve 108 to begin to allow fluid to flow into a chamber or cylinder of an ICE.

In FIG. 1B, magnet 114 is connected to or forms part of actuator 102. In FIG. 1B, with actuator 102 in the transition position, magnet 114 and actuator 102 have moved outward from actuator housing 112 beyond end plane 116 (at least partially). According to some implementations, magnetic sensor 124, arranged as shown in FIG. 1B, may sense that actuator 102 is in the transition position based on measuring a set of components of the magnetic field of magnet 114 that indicate the position of magnet 114 (and correspondingly, actuator 102 and/or valve 108) along longitudinal axis 106 that corresponds to the transition position. Furthermore, magnetic sensor arrangement 110 of example implementation 100 may allow an ECU, via position measurements of magnetic sensor 124, to detect when (or a time at which) actuator 102 transitions from a closed position (shown in FIG. 1A) to a transition position (shown in FIG. 1B) or open position (shown in FIG. 1C). For example, magnetic sensor arrangement 110 of example implementation 100 may allow magnetic sensor 124 to determine the position of magnet 114 (and correspondingly actuator 102 and/or valve 108) within a tolerance range (e.g., approximately 0.1 millimeter (mm)). As such, as soon as actuator 102 moves from the closed position outward from end plane 116 (e.g., approximately 0.1-0.5 mm), magnetic sensor 124 may detect that actuator 102 is in a transition position (or an open position) and that valve 108 has begun to open (or is open). Furthermore, in some implementations, an ECU, via the position measurements of magnetic sensor 124 may determine a speed or acceleration of actuator 102 and/or valve 108).

In FIG. 1C, example implementation 100 includes hydraulic actuator system 104 with actuator 102 in an open position. Actuator 102 may be in an open position such that valve 108 may be in an open position. For example, valve 108 may be in an open position in that valve 108 allows fluid to flow into a chamber of valve 108. More specifically, actuator 102, being in the open position as shown in FIG. 1C, may cause valve 108 to allow fluid to flow into a cylinder of an ICE. In some implementations, actuator 102 may be in a fully opened position in the example of FIG. 1C. For example, when in the fully opened position, valve 108 may allow fluid to flow into a chamber of valve 108 (e.g., a cylinder of an ICE) at its maximum rate.

In FIG. 1C, magnet 114 is shown connected to or formed as a part of actuator 102. In FIG. 1C, with actuator 102 in the open position, magnet 114 and actuator 102 have moved further outward from actuator housing 112 beyond end plane 116, relative to the transition position of FIG. 1B. According to some implementations, magnetic sensor arrangement 110, as shown in FIG. 1C, may sense that actuator 102 is in the open position based on measuring a set of components of the magnetic field of magnet 114 that indicate the position of magnet 114 (and correspondingly, actuator 102 and/or valve 108) along longitudinal axis 106 that corresponds to the open position. Furthermore, magnetic sensor arrangement 110 of example implementation 100 may allow magnetic sensor 124 to sense positions of actuator 102 that may be used (e.g., by an ECU) to determine a time at which actuator 102 reaches the open position (e.g., from the transition position or another open position). In some implementations, magnetic sensor arrangement 110 of example implementation 100 may allow magnetic sensor 124 sense positions of actuator 102 that may be used (e.g., by an ECU) to detect the time at which actuator 102 transitions from an open position toward a transition position (FIG. 1B) or toward a closed position (FIG. 1A). Furthermore, magnetic sensor 124 may measure positions that may be used to determine a speed or acceleration at which actuator 102 or valve 108 are moving from an open position toward a transition position or toward a closed position.

As further shown in FIGS. 1A-1C, magnet 114 may be connected to or formed on actuator 102 relative to a position of magnetic sensor 124 and/or end plane 116 of actuator housing 112. For example, as shown in FIG. 1A, magnet 114 may be arranged such that magnet 114 is within actuator housing 112 in the closed position. More specifically, a first edge (e.g. an outer edge, identified as the rightmost edge of magnet 114 in FIG. 1A) of magnet 114 is substantially aligned with end plane 116 of actuator housing 112 or within actuator housing 112 and a second edge (e.g., an inner edge, identified as a the leftmost edge of magnet 114 in FIG. 1A) of magnet 114 is within actuator housing 112 when actuator 102 is in the closed position. Additionally, or alternatively, as shown in FIGS. 1B-1C, when actuator 102 is in the transition position and/or the open position, the first edge and/or the second edge of magnet 114 may be beyond end plane 116 of actuator housing 112.

In this way, magnetic sensor arrangement 110 of FIGS. 1A-1C, including magnetic sensor 124 connected to actuator housing 112 such that a portion of magnetic sensor 124 extends beyond end plane 116, may measure an accurate position of magnet 114 (and correspondingly, actuator 102 and/or valve 108) along longitudinal axis 106. Accordingly, highly accurate position information of actuator 102 may be fed back to an ECU for closed loop control, which enables the ECU to control actuator 102 based on a current position, speed, and/or acceleration of actuator 102.

As indicated above, FIGS. 1A-1C are provided merely as examples. Other examples are possible and may differ from what was described with regard to FIGS. 1A-1C. For example, some implementations herein may be used in any system that includes an object that moves longitudinally along an axis (e.g., electromechanical actuators, mechanical actuators, valves, and/or the like).

Figure 2A:
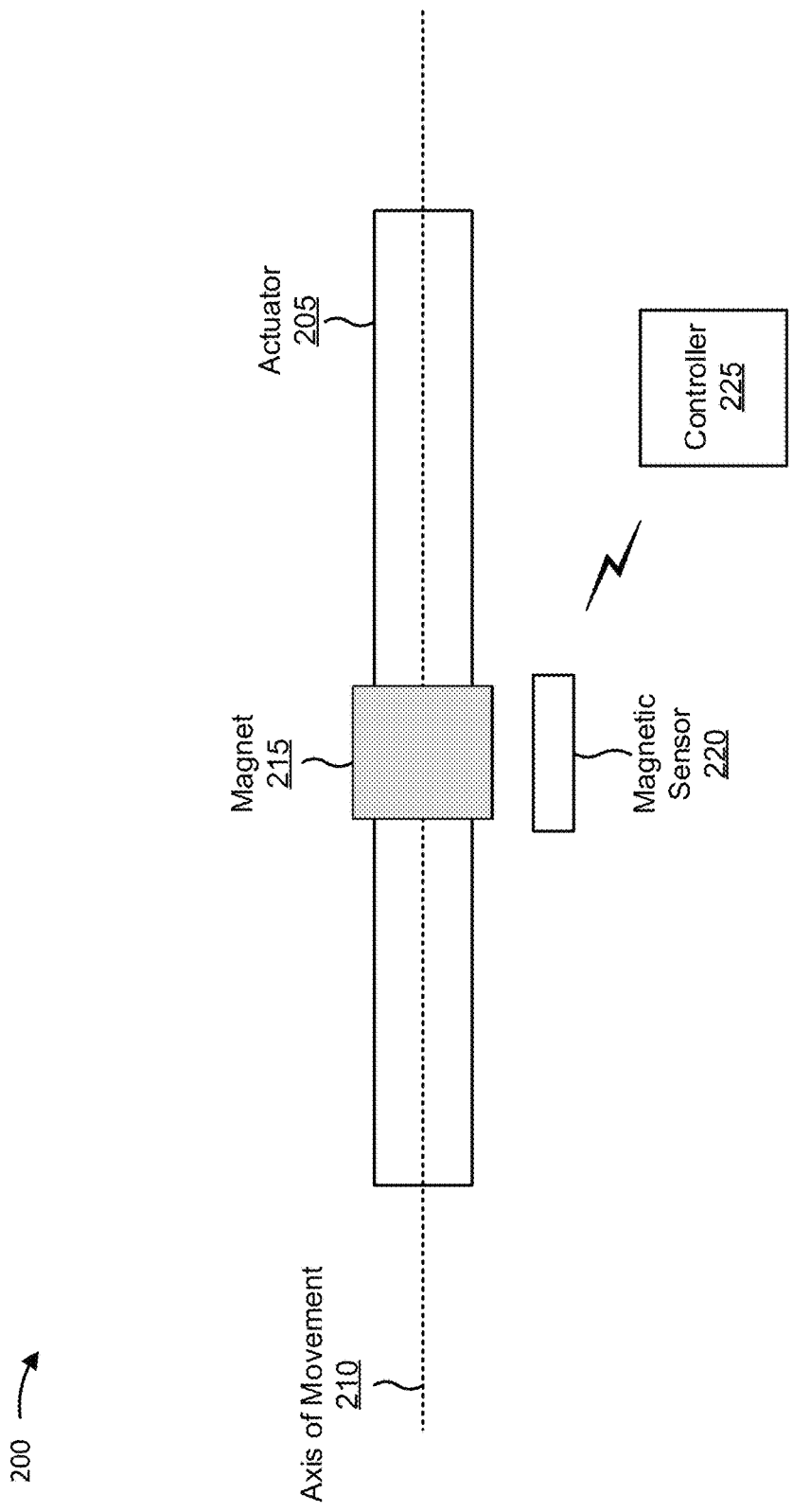

FIG. 2A is a diagram of an example environment 200 in which apparatuses, magnetic sensor arrangements, and/or systems described herein may be implemented. As shown in FIG. 2A, environment 200 may include an actuator 205 (which corresponds to actuator 102) that may be positioned (e.g., via linear movement) with respect to an axis of movement 210 (which may be referred to herein as a "longitudinal axis" of an actuator housing, and corresponds to longitudinal axis 106), a magnet 215 (which corresponds to magnet 114) connected to actuator 205, a magnetic sensor 220 (which corresponds to magnetic sensor 124), and a controller 225. In some implementations, actuator 205 may be any object capable of moving along axis of movement 210 (e.g., a mechanical transfer element, a piston, and/or the like).

Actuator 205 may be an object for which a linear position, linear movement, and/or the like is to be identified, measured, and/or determined for a given application. For example, actuator 205 may include an actuator for use within a hydraulic actuator system (e.g., a hydraulic actuator system that controls a valve of an ICE). In some implementations, actuator 205 is connected to (e.g., attached to, coupled with, affixed to, embedded in, formed as a part of, and/or the like) magnet 215, as described below.

In some implementations, actuator 205 is capable of reciprocating along axis of movement 210. Accordingly, actuator 205 is capable of being positioned in at least two linear positions along axis of movement 210. For example, as shown in FIG. 2A, if actuator 205 is a closed position (e.g., when valve 108, connected to actuator 205, is blocking fluid from flowing into a cylinder of an ICE), then actuator 205 may be in a first position along axis of movement 210. Additionally, or alternatively, if actuator 205 is in an open position (e.g., when valve 108 is allowing fluid to flow into a cylinder of an ICE), then actuator 205 may be in a second position along axis of movement 210.

Magnet 215 includes a magnet that is connected (e.g., attached, coupled, affixed, fastened, clipped, clamped, and/or the like) to actuator 205 such that a position of magnet 215 corresponds to a position of actuator 205, as described herein. In some implementations, magnet 215 may be overmolded to actuator 205 or a mechanical element connected to actuator 205, such as a cap, a valve disk, a valve stem, or the like. For example, actuator 205 and/or a mechanical element connected to actuator 205 may include a cavity (e.g., a ring cavity) that are the dimensions of magnet 215. Magnet 215 may then be overmolded to actuator 205 or the mechanical element by filling the cavity with a magnetic mold material to create magnet 215.

In some implementations, magnet 215 may be comprised of a ferrite material (e.g., Hard Ferrite), and may produce a magnetic field. In some implementations, magnet 215 may include polyamide (PA) or polyphenylene sulfide (PPS) as carrier material and ferrite magnet material (which may be manufactured in injection mold process). In some implementations, magnet 215 may further comprise a rare earth magnet material, which may be of advantage due to an intrinsically high magnetic field strength of rare earth magnets.

In some implementations, magnet 215 comprises a first half forming a north pole (N) and a second half forming a south pole (S), so that magnet 215 comprises one pole pair. FIGS. 2B-2D are diagrams of example magnetizations and/or shapes of magnet 215 that may be used in magnet 215 of FIG. 2A. As shown in 2B, magnet 215 may include an axially magnetized ring magnet with a north pole on a first half of magnet 215 that is considered to be magnetized in an axial direction (e.g., along the axis of movement 210) on a south pole on a second half of magnet 215. As another example, as shown in FIG. 2C, magnet 215 may include a diametrically magnetized ring magnet with a north pole on a first half of magnet 215 and a south pole on a second half of magnet 215. As still another example, magnet 215 may include a dipole magnet (e.g., a dipole bar magnet, a cylindrical dipole magnet, an elliptical dipole magnet, etc.), a permanent magnet, an electromagnet, a magnetic tape, and/or the like. In some implementations, as shown in FIG. 2D, magnet 215 may, without limitation, comprise a ring magnet with more than one pole pair. Accordingly, the magnetization of magnet 215 (and, correspondingly, magnet 114) may be set and/or adjusted according to particular applications, hydraulic actuator systems, environments of a hydraulic actuator system (e.g., an ICE or vehicle/machine utilizing an ICE), and/or the like incorporating example implementations of the magnetic sensor arrangement described herein.

In some implementations, a dimension of magnet 215 (e.g., a length, a width, a height, a diameter, an inner radius, an outer radius, and/or the like) may be in a range from approximately 1 millimeter (mm) to approximately 15 mm, such as 10 mm. Magnet 215 may be a ring magnet and actuator 205 may be cylindrical. As a particular example, magnet 215 may have a thickness or height of approximately 3 mm, an inner radius of approximately 4 mm, and an outer radius of approximately 10 mm (i.e., magnet 215 may be a 3 mm height×4 mm inner radius×10 mm outer radius ring magnet). Notably, while magnet 215 may be primarily described as a ring magnet according to example implementations herein, magnet 215 may have another shape, such as a cubical shape, a cylindrical shape, an elliptical shape, a triangular shape, a polygonal shape, and/or the like.

In some implementations, magnet 215 may be connected to actuator 205 in a symmetric manner. For example, a center axis of magnet 215 may align with axis of movement 210. In some implementations, magnet 215 may be connected to actuator 205 in an asymmetric manner. For example, a center axis of magnet 215 may not align with axis of movement 210.

Magnetic sensor 220 of FIG. 2A includes one or more apparatuses for sensing a set of components of a magnetic field of magnet 215 for use in determining a position of actuator 205 (e.g., based on a position of magnet 215 relative to magnetic sensor 220). For example, magnetic sensor 220 may include one or more circuits (e.g., one or more integrated circuits) that operate to sense a set of components of the magnetic field produced by magnet 215. According to some implementations, a set of components may include one or more of an intensity of a magnetic field (e.g., a magnetic flux density and/or a magnetic field strength), a magnetic field magnitude, a magnetic field direction, and/or the like.

In some implementations, magnetic sensor 220 may be a three dimensional (3D) magnetic sensor capable of sensing three directional components of a magnetic field (e.g., an x-component, a y-component, and a z-component). In some implementations, magnetic sensor 220 may include an integrated circuit that includes an integrated controller 225 (e.g., such that an output of magnetic sensor 220 may include information that describes a position of magnet 215 and/or a position of actuator 205). In some implementations, magnetic sensor 220 may include sensing elements (e.g., which may implement magneto-sensitive elements 130) configured to sense the set of components of the magnetic field produced by magnet 215. Additional details regarding magnetic sensor 220 are described below with regard to FIG. 3.

In some implementations, magnetic sensor 220 may be arranged at a position relative to magnet 215 such that magnetic sensor 220 may detect components of a magnetic field produced by magnet 215. For example, as shown in FIG. 2A, magnetic sensor 220 may be arranged such that magnetic sensor 220 is a particular distance from the axis of movement 210, such that an air gap (e.g., the air gap 128) may be present between magnetic sensor 220 and magnet 215 when magnet 215 passes magnetic sensor 220 as magnet 215 reciprocates along axis of movement 210.

In some implementations, magnetic sensor 220 may be configured with mapping information associated with determining the position of actuator 205 based on the sensed set of components of the magnetic field. The mapping information may include information associated with a position and a set of components of the magnetic field corresponding to the position. The mapping information may include such information for multiple positions. For example, referring to the example of above, the mapping information may include information associated with at least a closed position, a transition position, and an open position of actuator 102 and corresponding sets of components of the magnetic field of magnet 114 at the closed position, the transition position, and the open position. In some implementations, magnetic sensor 220 may be configured with the mapping information during a manufacturing process associated with the magnetic sensor system, a calibration process associated with the magnetic sensor system, a setup process associated with the magnetic sensor system, and/or the like.

During operation, magnetic sensor 220 may sense the set of components of the magnetic field of magnet 215. Magnetic sensor 220 may then compare the sensed set of components of the magnetic field to the mapping information, and determine the position of actuator 205 based on the comparison. For example, magnetic sensor 220 may identify sets of components of the magnetic field, included in the mapping information, that match (e.g., within a threshold or that satisfy of matching) the sensed set of components of the magnetic field (e.g., an intensity of the magnetic field, a magnitude of the magnetic field, and/or a direction of the magnetic field that matches the sensed intensity of the magnetic field, magnitude of the magnetic field, and/or direction of the magnetic field). In this example, magnetic sensor 220 may determine the position of actuator 205 as the position corresponding to the matched mapping information.

Controller 225 of FIG. 2A may include one or more circuits associated with determining a position of actuator 205, and providing information associated with the position of actuator 205. For example, controller 225 may include one or more circuits (e.g., an integrated circuit, a control circuit, a feedback circuit, etc.). Controller 225 may receive input signals from one or more sensors, such as one or more magnetic sensors 220, may process the input signals (e.g., using an analog signal processor, a digital signal processor, etc.) to generate an output signal, and may provide the output signal to one or more other devices or systems. For example, controller 225 may receive one or more input signals from magnetic sensor 220, and may use the one or more input signals to generate an output signal comprising the state of actuator 205 to which magnet 215 is connected. In some implementations, controller 225 may be implemented by an ECU.

The number and arrangement of apparatuses shown in FIG. 2A are provided as an example. In practice, there may be additional apparatuses, fewer apparatuses, different apparatuses, or differently arranged apparatuses than those shown in FIG. 2A. Furthermore, two or more apparatuses shown in FIG. 2A may be implemented within a single apparatus, or a single apparatus shown in FIG. 2A may be implemented as multiple, distributed apparatuses. Additionally, or alternatively, a set of apparatuses (e.g., one or more apparatuses) of environment 200 may perform one or more functions described as being performed by another set of apparatuses of environment 200.

FIG. 3 is a diagram of example elements of magnetic sensor 220 of FIG. 2A (which may correspond to magnetic sensor 124). As shown, magnetic sensor 220 may include a set of sensing elements 310 (which may be referred to herein individually as "sensing element 310" or collectively as "sensing elements 310"), an analog-to-digital convertor (ADC) 320, a digital signal processor (DSP) 330, a memory element 340, and a digital interface 350.

Sensing element 310 includes an element for sensing a component or set of components of a magnetic field present at magnetic sensor 220 (e.g., the magnetic field generated by magnet 215). For example, sensing element 310 may include a Hall-based sensing element that operates based on a Hall-effect. As another example, sensing element 310 may include a magnetoresistive based (MR-based) sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 310 may operate based on an anisotropic magnetoresistance (AMR) effect, a giant magnetoresistance (GMR) effect, a tunnel magnetoresistance (TMR) effect, and/or the like. As an additional example, sensing element 310 may include a variable reluctance (VR) based sensing element that operates based on induction. In some implementations, magnetic sensor 220 may include a differential sensor with multiple sensing elements 310. For example, magnetic sensor 220 may include a first sensing element 310 that operates to sense a first set of components of the magnetic field at the first sensing element, and a second sensing element 310 that operates to sense a second set of components of the magnetic field at the second sensing element. In this case, magnetic sensor 220 may compute the difference between the sets of components of the magnetic field to determine the position of a magnet (and/or an actuator or valve connected to the magnet).

ADC 320 may include an analog-to-digital converter that converts an analog signal from the set of sensing elements 310 to a digital signal. For example, ADC 320 may convert analog signals, received from the set of sensing elements 310, into digital signals to be processed by DSP 330. ADC 320 may provide the digital signals to DSP 330. In some implementations, magnetic sensor 220 may include one or more ADCs 320.

DSP 330 may include a digital signal processing device or a collection of digital signal processing devices. In some implementations, DSP 330 may receive digital signals from ADC 320 and may process the digital signals to form output signals (e.g., destined for controller 225 as shown in FIG. 2A), such as output signals associated with determining the position of magnet 215 along axis of movement 210.

Memory element 340 may include a read only memory (ROM) (e.g., an electrically erasable programmable read-only memory (EEPROM)), a random access memory (RAM), and/or another type of dynamic or static storage device (e.g., a flash memory, a magnetic memory, an optical memory, etc.) that stores information and/or instructions for use by magnetic sensor 220. In some implementations, memory element 340 may store information associated with processing performed by DSP 330. Additionally, or alternatively, memory element 340 may store configurational values or parameters for the set of sensing elements 310 and/or information for one or more other elements of magnetic sensor 220, such as ADC 320 or digital interface 350.

Digital interface 350 may include an interface via which magnetic sensor 220 may receive and/or provide information from and/or to another device, such as controller 225 (see FIG. 2A). For example, digital interface 350 may provide the output signal, determined by DSP 330, to controller 225 and may further receive information from the controller 225.

The number and arrangement of elements shown in FIG. 3 are provided as an example. In practice, magnetic sensor 220 may include additional elements, fewer elements, different elements, or differently arranged elements than those shown in FIG. 3. Additionally, or alternatively, a set of elements (e.g., one or more elements) of magnetic sensor 220 may perform one or more functions described as being performed by another set of elements of magnetic sensor 220.

Figure 4:
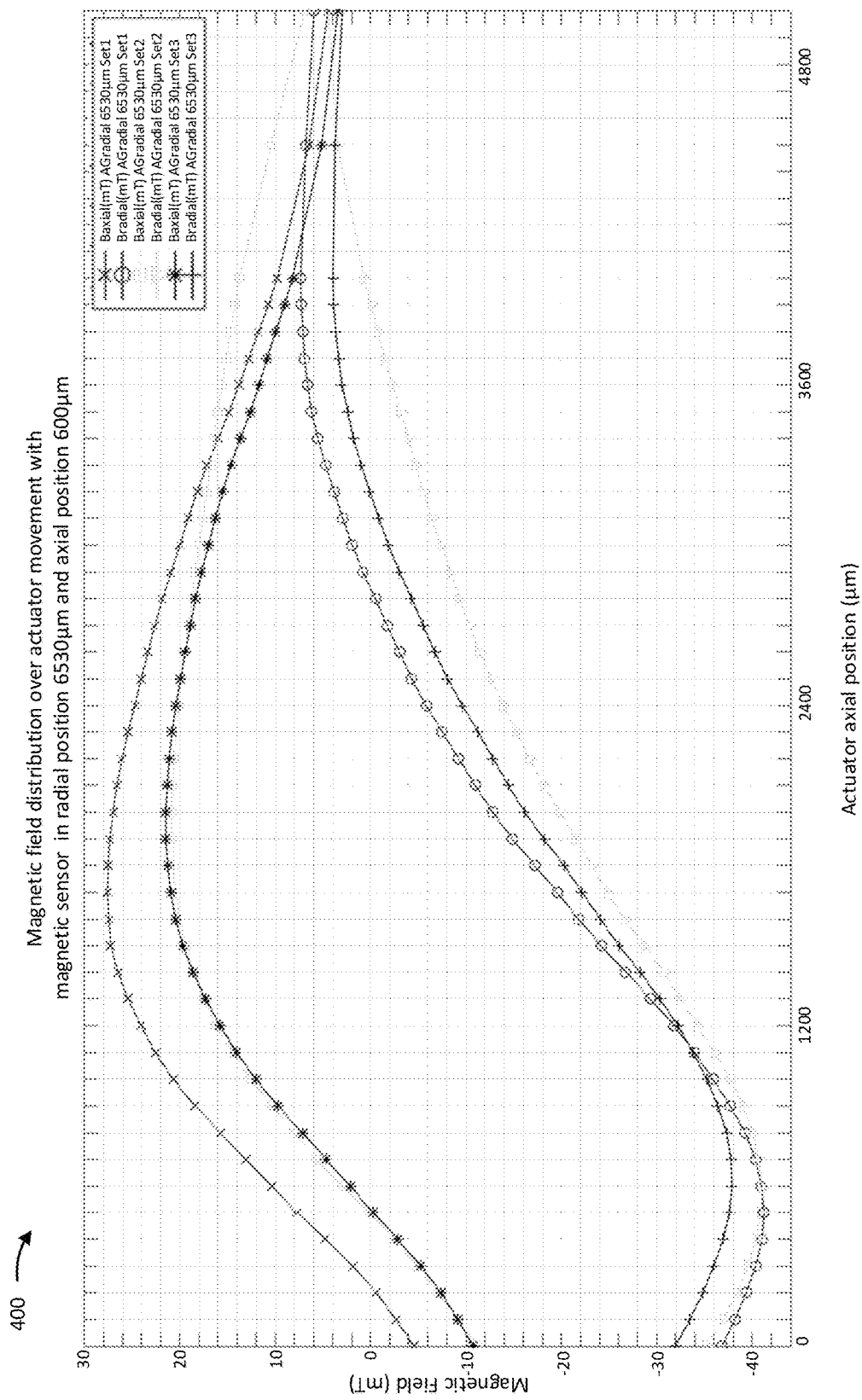
FIGS. 4-6 are diagrams associated with example implementations of a magnetic sensor arrangement described herein.

FIG. 4 is a diagram associated with an example implementation of the magnetic sensor arrangement described herein, such as example implementation 100. FIG. 4 is associated with an example simulation 400 of the magnetic sensor arrangement described herein. For the purposes of example simulation 400, magnetic sensor 124 is connected to actuator housing 112 and magnet 114 is connected to or formed as a part of actuator 102 according to example implementation 100. Accordingly, example simulation 400 of FIG. 4 illustrates magnetic field measurements made by magnetic sensor 124 as actuator 102 moves axially along longitudinal axis 106.

The example simulation 400 of FIG. 4 is a graphical representation of a magnetic field distribution over actuator movement with magnetic sensor in radial position 6530 micrometer (μm) and axial position 600 μm, where longitudinal axis 106 may be radial position 0 μm and end plane 116 may be axial position 0 μm. In example simulation 400, three sets of measurements are provided (Set1, Set2, Set3 corresponding to components (e.g., an axial component (Baxial) and a radial component (Bradial) of a magnetic flux density of the magnetic field of magnet 114 measured by magnetic sensor 124 are shown relative to the axial position of actuator 102 (i.e., the position of actuator 102 along longitudinal axis 106). As an example, the three sets of measurements may correspond to measurements of three different valves 108 (or types of valves 108) connected to actuator 102, three different types of actuators 102, three different configurations of magnet 114 on actuator 102, and/or the like.

As shown, a profile may be established for valves 108 corresponding to the sets of measurements Set1, Set2, Set3. Accordingly, as indicated by FIG. 4, when a magnetic sensor (e.g., magnetic sensor 124) makes a magnetic field measurement (e.g., of an axial component (Baxial) measurement and/or a radial component (Bradial) measurement) that matches or is similar to a magnetic field measurement of the simulation 400, a position of an actuator (e.g., actuator 102 that is connected to valves 108 of Set1, Set2, Set3) may be accurately determined based on the magnetic field measurements.

In this way, magnetic field measurements may be measured and/or provided by magnetic sensor 124 to determine an accurate position of actuator 102 on longitudinal axis 106.

Figure 5:
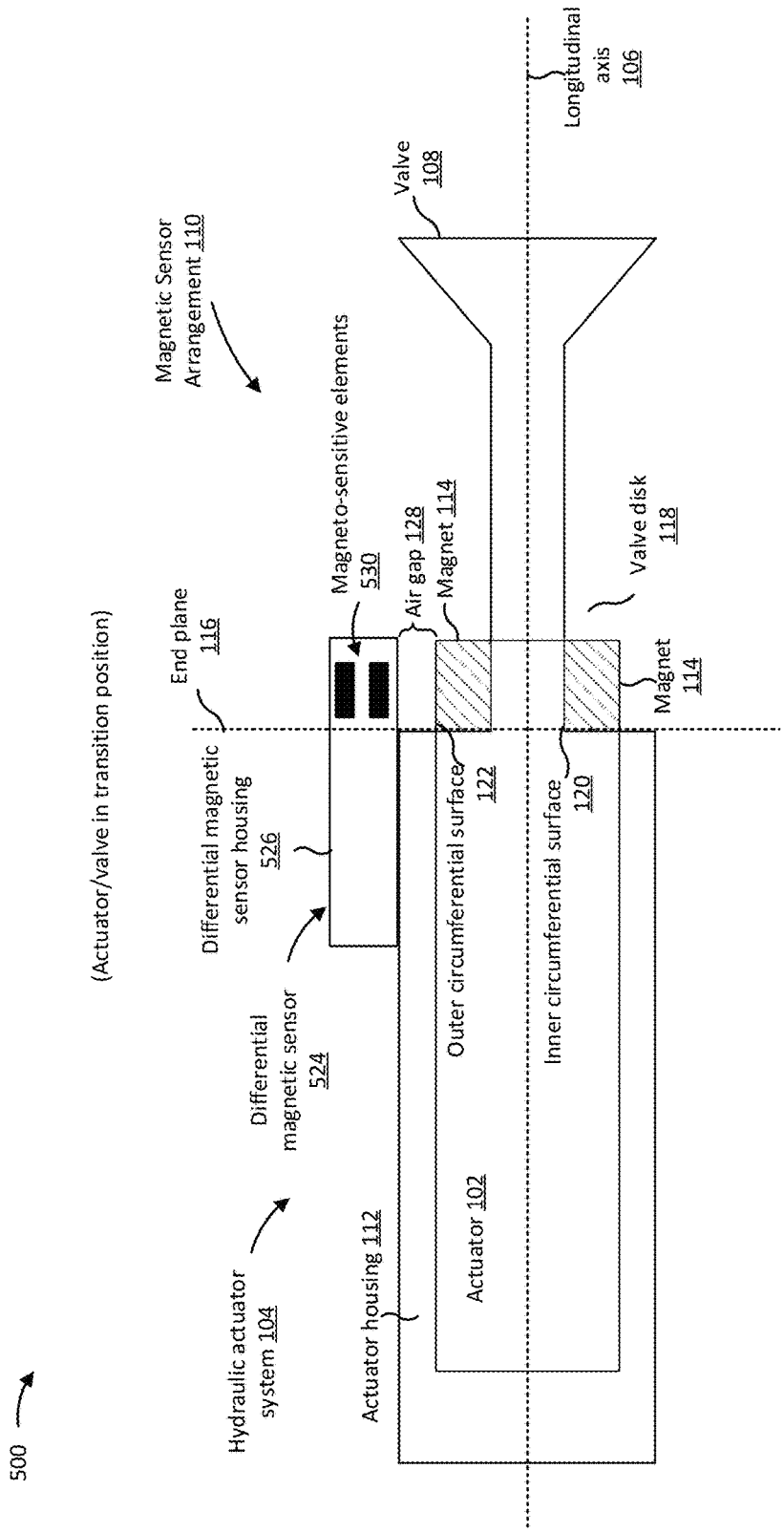

FIG. 5 is a diagram associated with example implementation 500 of the magnetic sensor arrangement described herein. In FIG. 5, reference numbers in common with FIGS. 1A-1C identify the same or similar elements. For example, example implementation 500 may include actuator 102, hydraulic actuator system 104, longitudinal axis 106, valve 108, magnetic sensor arrangement 110, actuator housing 112, magnet 114, end plane 116, inner circumferential surface 120, outer circumferential surface 122, air gap 128, and/or one or more other features described above in connection with FIGS. 1A-1C.

As shown in FIG. 5, example implementation 500 includes magnetic sensor arrangement 110 with a differential magnetic sensor 524 (which corresponds to magnetic sensor 124) with a differential magnetic sensor housing 526 (which corresponds to sensor housing 126) with multiple magneto-sensitive elements 530 (which corresponds to magneto-sensitive elements 130) (e.g., at least two magneto-sensitive elements). Accordingly, differential magnetic sensor 524 may receive multiple measurements of a set of components of the magnetic field of magnet 114. Because the separate magneto-sensitive elements may be positioned differently relative to magnet 114 as magnet 114 moves along longitudinal axis 106, differential magnetic sensor 524 may calculate a differential measurement from the magnetic field measurements of the separate magneto-sensitive elements 130. The magneto-sensitive elements 130 may be a same type (e.g., both Hall-based, both MR-based, both AMR, both GMR, both TMR, both VR, etc.) or different type (e.g., one Hall-based, the other MR-based, or one AMR, the other GMR, or one TMR, the other VR; etc.) of magneto-sensitive element. Accordingly, magnetic sensor arrangement 110 of FIG. 5 provides an ability to accurately measure an axial component of a magnetic field of magnet 114, and thus make an accurate determination of the position of magnet 114 (and correspondingly actuator 102 and valve 108) relative to differential magnetic sensor 524. Furthermore, magnetic sensor arrangement 110 of FIG. 5, using differential magnetic sensor 524, may allow for robustness and an ability to withstand the presence of interfering magnetic fields, while being able to accurately determine the position of magnet 114.

As indicated above, FIG. 5 is provided merely as an example. Other examples are possible and may differ from what was described with regard to FIG. 5.

Figure 6:
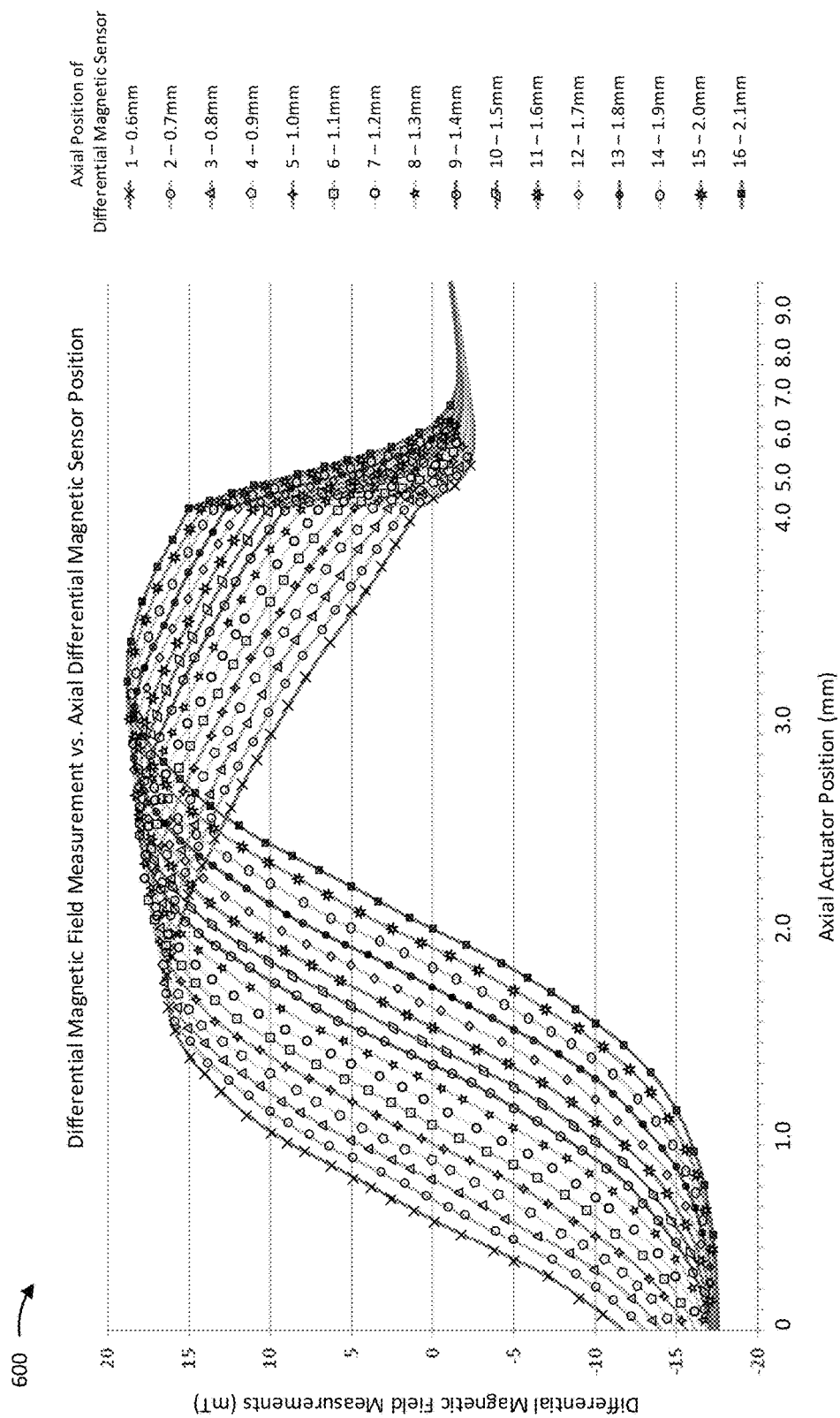

FIG. 6 is a diagram associated with an example implementation of the magnetic sensor arrangement described herein. FIG. 6 is a diagram associated with an example simulation 600 of the magnetic sensor arrangement described in connection with FIG. 5. For purposes of example simulation 600, differential magnetic sensor 524 is connected to actuator housing 112 and magnet 114 is connected to or formed as a part of actuator 102 according to example implementation 500. FIG. 6 illustrates magnetic field measurements made by differential magnetic sensor 524 as actuator 102 moves axially along longitudinal axis 106.

The example simulation 600 of FIG. 6 is a graphical representation of differential magnetic field measurements measured versus axial position of differential magnetic sensor 524. In example simulation 600, 16 sets of measurements are provided with differential magnetic sensor 524 being in axial positions from 0.6 mm to 2.1 mm, with 0.1 mm increments. Differential magnetic field measurements are graphically presented (e.g., plotted) as actuator 102 moves along longitudinal axis 106. As an example, the 16 sets of measurements may correspond to differential magnetic sensor 524 being positioned between 0.6 mm and 2.1 mm (at 0.1 mm intervals) from end plane 116. As shown, a profile may be established for positions of differential magnetic sensor 524 relative to a position of actuator 102. Accordingly, as indicated by FIG. 6, when a magnetic sensor (e.g., magnetic sensor 124) makes a differential magnetic field sensor measurement that matches or is similar to one or more of the differential magnetic field measurements of the simulation 600, a position of an actuator (e.g., actuator 102 with a position corresponding to one or more of the 16 sets of measurements) along longitudinal axis 106 may be determined.

In this way, differential magnetic sensor 524 may be positioned to measure and/or provide an accurate position of actuator 102 on longitudinal axis 106.

Figure 7:
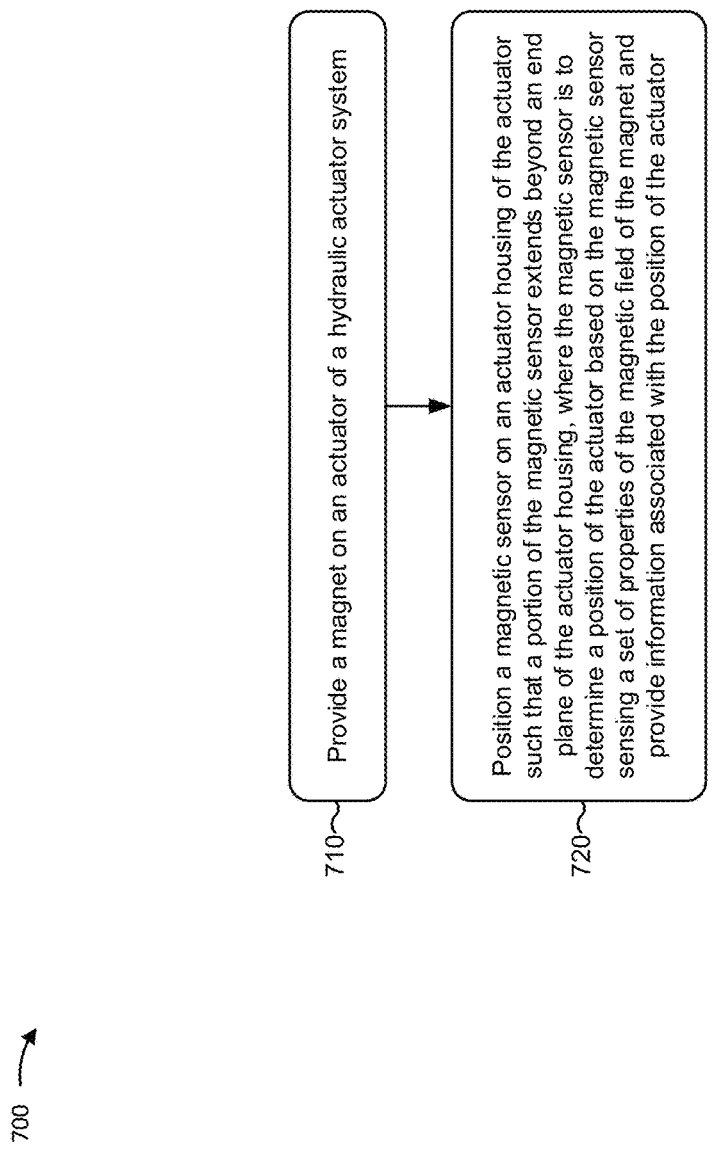
FIG. 7 is flow chart of an example process for determining a state of an object using the magnetic sensor system described herein.

FIG. 7 is a flow chart of an example process 700 for determining a position of actuator 205 using the magnetic sensor arrangement described herein. In some implementations, one or more process blocks of FIG. 7 may be performed to assemble magnetic sensor arrangement 110. In some implementations, one or more process blocks of FIG. 7 may be performed by devices (e.g., assembly or manufacturing devices or machines) associated with magnetic sensor arrangement 110, hydraulic actuator system 104, and/or the components of example implementation 100.

As shown in FIG. 7, process 700 may include providing a magnet on an actuator of a hydraulic actuator system (block 710). For example, magnet 215 may be provided on actuator 205 of a hydraulic actuator system (e.g., hydraulic actuator system 104). In some implementations, the magnet may be provided on the actuator by an adhesion process, an over molding process, an injection molding process, a manufacturing process, a fit process, and/or the like.

As further shown in FIG. 7, process 700 may include positioning a magnetic sensor on an actuator housing of the actuator such that a portion of the magnetic sensor extends beyond an end plane of the housing of the actuator, where the magnetic sensor is to determine a position of the actuator based on the magnetic sensor sensing a set of components of the magnetic field of the magnet and provide information associated with the position of the actuator (block 720). For example, magnetic sensor 220 may be positioned on an actuator housing (e.g., actuator housing 112) of actuator 205 such that a portion of magnetic sensor 220 (e.g., a portion that includes one or more magneto-sensitive elements 130, 530) extends beyond an end plane (e.g., end plane 116) of the actuator housing. In some implementations, the magnetic sensor may be positioned on the actuator by adhering a sensor housing of the magnetic sensor to the housing with an adhesive, over molding the sensor housing of the magnetic sensor to the actuator housing, fastening the sensor housing of the magnetic sensor to the actuator housing, clipping the sensor housing of the magnetic sensor to the actuator housing clamping the sensor housing of the magnetic sensor to the actuator housing, and/or the like.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some implementations described herein provide a magnetic sensor arrangement, including a magnetic sensor connected to an actuator housing of an actuator and a magnet connected to or formed as part of the actuator. In some implementations, the magnetic sensor is positioned to extend beyond an end plane of the actuator housing such that magneto-sensitive elements of the magnetic sensor may accurately determine (within 0.1 mm) a position of the actuator (and/or a corresponding valve or other object connected to the actuator) based on measurements of a magnetic field from the magnet. For example, the magnetic sensor may determine the magnet is in the actuator housing (when the valve is in a closed position) when no or little magnetic field is sensed from the magnet (e.g., due to shielding of the actuator housing), when the magnet is entering or exiting the actuator housing (when the valve is in a transition position) when a high magnetic field gradient is detected (e.g., due to the close proximity of the magnet to the magnetic sensor at that position), and when the magnet is outside of the actuator housing (when the valve is in an open position) due to the magnetic field gradient measured when the magnet is further from the magnetic sensor than when the magnet is exiting/entering the actuator housing. Accordingly, within applications of a hydraulic actuator system (e.g., within an ICE that uses hydraulic actuated valves), some implementations herein allow for closed loop control over the valves based on an accurate determination of the position of the actuator.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A magnetic sensor arrangement for determining a position of an actuator, the magnetic sensor arrangement comprising:
   a magnetic sensor to determine the position of the actuator,
   the actuator being configured to reciprocate along a longitudinal axis of an actuator housing of the actuator such that at least a portion of the actuator is to cross an end plane of the actuator housing when reciprocating along the longitudinal axis,
   a magnet being connected to or forming part of the actuator, and being movable by the actuator to be in the actuator housing at a first time, entering or exiting the actuator housing at a second time, and outside of the actuator housing at a third time, and
   where the magnetic sensor is to:

sense a set of components of a magnetic field generated by the magnet;
determine, based on the sensed set of components of the magnetic field, the position of the actuator along the longitudinal axis of the actuator housing of the actuator,
the magnetic sensor being connected to the actuator housing, and
a portion of the magnetic sensor being positioned at least in a first actuator position beyond the end plane of the actuator housing; and
determine that the magnet is one of:
in the actuator housing,
entering or exiting the actuator housing, or
outside of the actuator housing.

2. The magnetic sensor arrangement of claim 1, where the portion of the magnetic sensor includes a set of magneto-sensitive elements,
the set of magneto-sensitive elements to sense the set of components of the magnetic field.

3. The magnetic sensor arrangement of claim 2, where the set of magneto-sensitive elements includes at least two magneto-sensitive elements, and
where the magnetic sensor is further to:
perform a differential measurement of the set of components of the magnetic field based on the at least two magneto-sensitive elements sensing the set of components of the magnetic field.

4. The magnetic sensor arrangement of claim 1, where a first edge of the magnet is substantially aligned with the end plane of the actuator housing or within the actuator housing when the actuator is in a first position on the longitudinal axis, and
where a second edge of the magnet is within the actuator housing when the actuator is in the first position on the longitudinal axis.

5. The magnetic sensor arrangement of claim 4, where the first edge of the magnet is beyond the end plane of the actuator housing when the actuator is in a second position on the longitudinal axis,
the first position being a closed valve position and the second position being an open valve position.

6. The magnetic sensor arrangement of claim 4, where the first edge of the magnet is beyond the end plane of the actuator housing when the actuator is in a second position on the longitudinal axis, and
where the magnetic sensor is further to:
detect the position of the actuator as the actuator reciprocates between the first position and the second position.

7. The magnetic sensor arrangement of claim 1, where the magnetic sensor is connected to the actuator housing by at least one of:
adhering a sensor housing of the magnetic sensor to the actuator housing with an adhesive,
over molding the sensor housing of the magnetic sensor to the actuator housing,
fastening the sensor housing of the magnetic sensor to the actuator housing using a fastener,
clipping the sensor housing of the magnetic sensor to the actuator housing, or
clamping the sensor housing of the magnetic sensor to the actuator housing.

8. The magnetic sensor arrangement of claim 1, where the actuator comprises an actuator of a hydraulic actuator system that is connected to a valve.

9. The magnetic sensor arrangement of claim 8, where the valve comprises a valve of an internal combustion engine.

10. The magnetic sensor arrangement of claim 1, where the set of components include at least one of:
an intensity of the magnetic field,
the intensity including at least one of an axial component measurement of the magnetic field or a radial component measurement of the magnetic field,
a magnitude of the magnetic field, or
a direction of the magnetic field.

11. A hydraulic actuator system, comprising:
an actuator capable of reciprocating along a longitudinal axis of an actuator housing of the actuator;
a magnet connected to or formed as part of the actuator such that the magnet moves along the longitudinal axis extending from an end plane of the actuator housing,
the magnet being movable by the actuator to be in the actuator housing at a first time, entering or exiting the actuator housing at a second time, and outside of the actuator housing at a third time; and
a magnetic sensor to:
determine a position of the actuator on the longitudinal axis of the actuator housing based on sensing a set of components of a magnetic field applied to the magnetic sensor by the magnet,
a portion of the magnetic sensor extending beyond the end plane of the actuator housing, and
determine that the magnet is one of:
in the actuator housing,
entering or exiting the actuator housing, or
outside of the actuator housing.

12. The hydraulic actuator system of claim 11, wherein the portion of the magnetic sensor that extends beyond the end plane includes a set of magneto-sensitive elements,
where the set of magneto-sensitive elements are to sense the set of components of the magnetic field of the magnet.

13. The hydraulic actuator system of claim 11, where a first edge of the magnet is substantially aligned with the end plane of the actuator housing or within the actuator housing when the actuator is in a first position on the longitudinal axis, and
where a second edge of the magnet is within the actuator housing when the actuator is in the first position on the longitudinal axis.

14. The hydraulic actuator system of claim 13, where the first edge of the magnet is beyond the end plane of the actuator housing when the actuator is in a second position on the longitudinal axis, and
where the magnetic sensor is further to:
detect when the actuator reciprocates between the first position and the second position.

15. The hydraulic actuator system of claim 13, where the first edge of the magnet is beyond the end plane of the actuator housing when the actuator is in a second position on the longitudinal axis, and
where the magnetic sensor is further to:
detect the position of the actuator as the actuator reciprocates between the first position and the second position.

16. The hydraulic actuator system of claim 11, where the actuator comprises a cavity, and
where the magnet is overmolded to the actuator by filling the cavity with a magnetic mold material,
the magnetic mold material to form the magnet.

17. The hydraulic actuator system of claim 11, where the magnetic sensor is connected to the actuator housing such that at least one of:
- a sensor housing of the magnetic sensor is adhered to the actuator housing with an adhesive,
- the sensor housing of the magnetic sensor is over molded to the actuator housing,
- the sensor housing of the magnetic sensor is fastened to the actuator housing,
- the sensor housing of the magnetic sensor is clipped to the actuator housing, or
- the sensor housing of the magnetic sensor is clamped to the actuator housing.

18. A method, comprising:
- determining, by a device and based on a magnetic sensor sensing a set of components of a magnetic field of a magnet, a position of an actuator of a hydraulic actuator system,
  - the magnet being on the actuator,
  - the magnetic sensor being on an actuator housing of the actuator such that a portion of the magnetic sensor extends beyond an end plane of the actuator housing;
- providing, by the device, information associated with the position of the actuator, and
  - the magnet being movable by the actuator to be in the actuator housing at a first time, entering or exiting the actuator housing at a second time, and outside of the actuator housing at a third time; and
- determining, by the device, that the magnet is one of:
  - in the actuator housing,
  - entering or exiting the actuator housing, or
  - outside of the actuator housing.

19. The method of claim 18, where the portion of the magnetic sensor that extends beyond the end plane of the actuator housing includes a set of magneto-sensitive elements,
- the set of magneto-sensitive elements to sense the set of components of the magnetic field of the magnet.

20. The method of claim 18, where the magnetic sensor is positioned on the actuator housing by at least one of:
- adhering a sensor housing of the magnetic sensor to the actuator housing with an adhesive,
- over molding the sensor housing of the magnetic sensor to the actuator housing,
- fastening the sensor housing of the magnetic sensor to the actuator housing,
- clipping the sensor housing of the magnetic sensor to the actuator housing, or
- clamping the sensor housing of the magnetic sensor to the actuator housing.

* * * * *